(12) United States Patent
Matsuoka et al.

(10) Patent No.: US 8,054,743 B2
(45) Date of Patent: Nov. 8, 2011

(54) MOBILE COMMUNICATION TERMINAL, COMMUNICATION APPARATUS, MOBILE COMMUNICATION METHOD, AND COMMUNICATION METHOD

(75) Inventors: Hosei Matsuoka, Yokosuka (JP); Takayuki Tamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 694 days.

(21) Appl. No.: 12/189,431

(22) Filed: Aug. 11, 2008

(65) Prior Publication Data

US 2009/0052377 A1 Feb. 26, 2009

(30) Foreign Application Priority Data

Aug. 20, 2007 (JP) ................ P2007-213996
May 19, 2008 (JP) ................ P2008-131034

(51) Int. Cl.
*G01R 31/08* (2006.01)
*H04W 4/00* (2009.01)
*H04J 3/16* (2006.01)
(52) U.S. Cl. ........ 370/228; 370/242; 370/252; 370/338; 370/465
(58) Field of Classification Search .................. None
See application file for complete search history.

(56) References Cited

U.S. PATENT DOCUMENTS

| 6,970,459 | B1 | 11/2005 | Meier | |
|---|---|---|---|---|
| 7,376,097 | B2 * | 5/2008 | Yegin | 370/328 |
| 2002/0101841 | A1 | 8/2002 | Kilgore | |
| 2004/0029612 | A1 * | 2/2004 | Gorsuch | 455/552.1 |
| 2006/0062206 | A1 | 3/2006 | Krishnaswamy | |
| 2007/0109992 | A1 * | 5/2007 | Bennett | 370/328 |
| 2008/0101291 | A1 * | 5/2008 | Jiang et al. | 370/331 |

FOREIGN PATENT DOCUMENTS

| EP | 1562390 A1 | 8/2005 |
|---|---|---|
| JP | 2000-216815 | 8/2000 |
| JP | 2005-94138 | 4/2005 |
| JP | 2006-5772 | 1/2006 |
| JP | 2007-60494 | 3/2007 |
| WO | WO 2006/006115 A1 | 1/2006 |
| WO | WO 2006/038268 A1 | 4/2006 |

OTHER PUBLICATIONS

Hosei Matsuoka, et al., "Problem Statement and Requirements for Multi-Link Transport draft-matsuoka-multilink-transport-00.txt", IETF Standard-Working-Draft, Internet Engineering Task Force, XP015032227, Oct. 20, 2004, 7 pages.
Office Action issued Mar. 23, 2011, in China Patent Application No. 200810213002.3 (with English translation).
C. Perkins, "IP Mobility Support for IPv4", IETF RFC3344, Aug. 2002, pp. 1-99.
K. Sklower, et al., "The PPP Multilink Protocol (MP)" IETF RFC1717, Nov. 1994. pp. 1-21.

* cited by examiner

*Primary Examiner* — Nittaya Juntima
(74) *Attorney, Agent, or Firm* — Oblon, Spivak, McClelland, Maier & Neustadt, L.L.P.

(57) ABSTRACT

An object of the present invention is to make it possible to appropriately maintain PPP-based communications even in an environment in which the terminal moves and the communication environment continually changes. A mobile communication terminal comprises a plurality of wireless accessing devices for establishing PPP-based communication links for respectively different modes of wireless communications with a fixed communication apparatus, which is a communication partner; a PPP device for combining the established communication links; and a valid wireless LAN searching portion for detecting that wireless communication is possible for a wireless LAN adapter. The PPP device executes control so as to establish communication links for the wireless LAN adapter detected as being capable of wireless communication, and for a L2TP virtual device.

7 Claims, 10 Drawing Sheets

MOBILE COMMUNICATION TERMINAL, COMMUNICATION APPARATUS, MOBILE COMMUNICATION METHOD, AND COMMUNICATION METHOD

BACKGROUND OF THE INVENTION

1. Field of the Invention

The present invention relates to a mobile communication terminal, communication apparatus, mobile communication method, and communication method for establishing a communication link with a communication partner using PPP (Point-to-Point Protocol).

2. Related Background of the Invention

The IP mobility technique, which supports a channel change pursuant to a change of IP (Internet Protocol) address, is a communication technique for transmitting and receiving packets using a plurality of communication channels. Mobile IP (refer to IETF RFC3344 "IP Mobility Support for IPv4" (Non-Patent Document 1)) is a typical protocol of the IP mobility technique. Mobile IP supports mobility in the network layer, a communication terminal notifies a home agent of an IP address change, and communication is carried out with a communication partner via the home agent. This IP address change process can cause a break in or interruption of communications.

Further, there is also a method called multilink PPP, which combines a plurality of communication links into a single communication link (refer to IETF RFC1717 "The PPP Multilink Protocol (MP)" (Non-Patent Document 2)). In multilink PPP, since a single communication channel is visible as seen from the IP layer 3 protocol, the IP address does not change even when the communication channel is switched. If this multilink PPP is used, IP-wise, a plurality of communication links can be utilized by a single communication channel. However, multilink PPP is normally designed to combine a plurality of low-speed communication links to establish a high-speed link, and is premised on the fact that the quality of all the communication links is consistent.

Methods, which expand this multilink PPP, and which added control functions that allocate packets to communication links of different communications quality have also been proposed (refer to Japanese Patent Application Laid-open No. 2000-216815 (Patent Document 1) and Japanese Patent Application Laid-open No. 2007-60494 (Patent Document 2)). If these methods are used, packets can be efficiently transmitted by combining communication links of different communications quality.

SUMMARY OF THE INVENTION

The multilink PPP mentioned above is for the purpose of widening the bandwidth of a communication channel, and is not for providing handover between wireless links. That is, the above-mentioned methods do not constitute mechanisms for the addition of a newly validated wireless link or the removal of an invalidated wireless link during communications. Consequently, in the above-mentioned methods, it is possible that it will become impossible to appropriately maintain PPP-based communications in an environment in which the terminal moves and the communication environment continually changes.

The present invention has been made to solve for the above problems, and an object of the present invention is to provide a mobile communication terminal, communication apparatus, mobile communication method and communication method that make it possible to appropriately maintain PPP-based communications even in an environment in which the terminal moves and the communication environment continually changes.

To achieve the above-stated object, a mobile communication terminal related to the present invention comprises a plurality of wireless accessing means for establishing PPP-based communication links for respectively different modes of wireless communications with a communication partner; combining means for combining communication links established by a plurality of wireless accessing means; detecting means for detecting that wireless communication is possible for at least one of the plurality of wireless accessing means; and controlling means for executing control so as to establish the communication link for the wireless accessing means detected as being capable of wireless communication by detecting means.

In the mobile communication terminal related to the present invention, PPP-based communication links for respectively different modes of wireless communications are established with the communication partner by the plurality of wireless accessing means, and the established communication links are combined. Consequently, communications that use a plurality of communication links as a single communication channel are carried out between the mobile communication terminal related to the present invention and the communication partner. Further, the possibility of wireless communications for at least one wireless accessing means that carries out respectively different modes of wireless communications is detected, and communication links are established by detected wireless accessing means. Consequently, according to the mobile communication terminal related to the present invention, since it is possible to combine communication links that are valid at all times, PPP-based communications can be appropriately maintained even in an environment in which the terminal moves and the communication environment continually changes.

It is desirable that one of the wireless accessing means acquire an IP address, use the pertinent IP address to establish a L2 tunnel with the communication partner, and establish a communication link by way of the pertinent L2 tunnel. According to this configuration, a communication link can be established even if a PPP-based communication link cannot be established directly with the communication partner. Consequently, the redundancy of the communication link can be heightened, and communications can be appropriately maintained.

It is desirable that detecting means detect for at least one of the plurality of wireless accessing means that the communication link established by this wireless accessing means has become invalid, and that combining means remove the communication link detected by detecting means as being invalid. According to this configuration, it is possible to appropriately manage communication links in the mobile communication terminal.

It is desirable that the mobile communication terminal further comprise measuring means for measuring a radio field intensity of a communication link established by the wireless accessing means; switching means for switching a packet-transmitting communication link based on the radio field intensity measured by measuring means; and notifying means for notifying, when the packet-transmitting communication link has been switched by the switching means, the communication partner to that effect. According to this configuration, it is possible to efficiently and appropriately transmit packets to a communication partner by preventing packet loss due to radio field intensity degradation.

It is desirable that the mobile communication terminal further comprise communication link change receiving means for receiving a request to change the packet-transmitting communication link; switching means for switching the packet-transmitting communication link based on the communication link change request received by communication link change receiving means; and notifying means for notifying, when the packet-transmitting communication link has been switched by the switching means, the communication partner to that effect. According to this configuration, packets can be efficiently and appropriately transmitted to the communication partner based on a request from the communication partner in accordance with the utilization status of a communication line, and so on.

A communication apparatus related to the present invention comprises a plurality of communicating means for establishing PPP-based communication links for respectively different modes of communications with a communication partner; combining means for combining the communication links established by the plurality of communicating means; monitoring means for monitoring a communication status of at least one of the plurality of communicating means; and communication link change requesting means for requesting the communication partner to change a packet-transmitting communication link on the basis of the communication status monitored by monitoring means.

In the communication apparatus related to the present invention, the request to the above-mentioned mobile communication terminal that is the communication partner to change the packet-transmitting communication link is made in accordance with a communication status, such as the utilization status of the communication line. Therefore, according to the communication apparatus related to the present invention, it is possible to make efficient use of a communication line, and it is possible for the mobile communication terminal 10 to efficiently and appropriately transmit packets to the communication partner (its own apparatus).

Now then, in addition to describing the mobile communication terminal and communication apparatus as inventions as hereinabove, the present invention also describes as inventions the following mobile communication method and communication method. Only the category differs; otherwise these methods are the substantially the same invention, and exhibit the same operation and effect.

That is, a mobile communication method related to the present invention is a mobile communication method for a mobile communication terminal, which comprises a plurality of wireless accessing means for establishing with a communication partner PPP-based communication links for respectively different modes of wireless communications, and comprises a combination step of combining the communication links established by the plurality of wireless accessing means; a detection step of detecting that wireless communication is possible for at least one of the plurality of wireless accessing means; and a control step of executing control so as to establish the communication link for the wireless accessing means detected as being capable of wireless communication in the detection step.

Further, a communication method related to the present invention is a communication method for a communication apparatus, which comprises a plurality of communicating means for establishing PPP-based communication links for respectively different modes of communications with a communication partner, and comprises a combination step of combining the communication links established by the plurality of communicating means; a monitoring step of monitoring a communication status of at least one of the plurality of communicating means; and a communication link change request step of requesting the communication partner to change a packet-transmitting communication link based on the communication status monitored in the monitoring step.

According to the present invention, since it is possible to combine communication links that are valid at all times, PPP-based communications can be appropriately maintained even in an environment in which the terminal moves and the communication environment continually changes.

DESCRIPTION OF THE PREFERRED EMBODIMENTS

Figure 1:
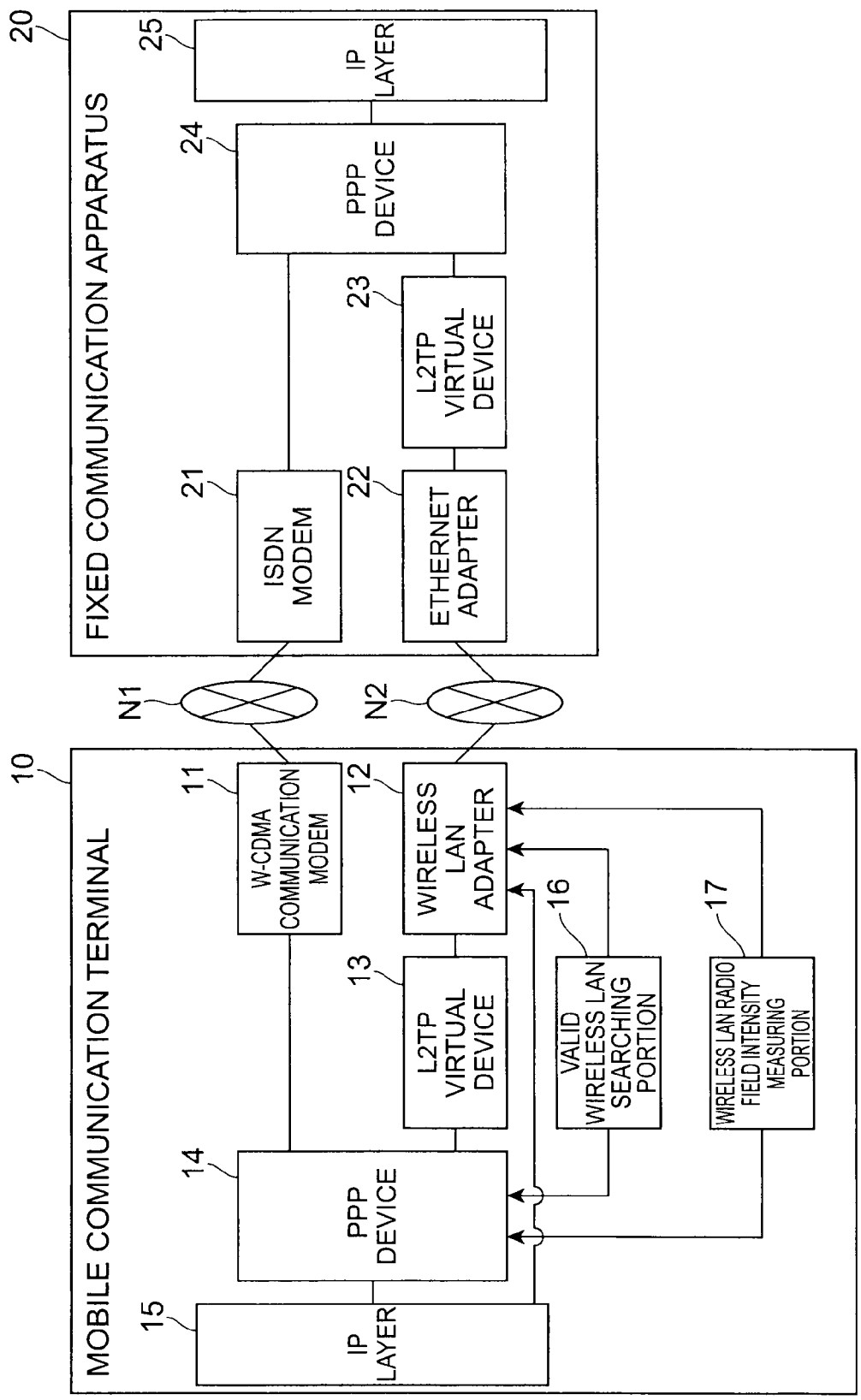
FIG. 1 is a diagram showing the functional configuration of a mobile communication terminal related to an embodiment of the present invention.

The preferred embodiments of the mobile communication terminal, communication apparatus, mobile communication method and communication method related to the present invention will be explained in detail hereinbelow together with the figures. Furthermore, when explaining the figures, the same reference numerals will be assigned to the same elements, and duplicate explanations will be omitted.

FIG. 1 shows the configuration of a mobile communication terminal 10 and a fixed communication apparatus 20 related to this embodiment. The mobile communication terminal 10 is a device, which can be connected to a plurality of communication networks N1, N2, and which is capable of carrying out a plurality of wireless communications having respectively different modes, and more specifically, corresponds to a mobile telephone or the like. As communication networks to which the mobile communication terminal 10 is capable of being connected, for example, there are a telephone network N1 and the Internet N2. As will be explained further below, the mobile communication terminal 10 is connected to the telephone network N1 via mobile communications (W-CDMA (Wideband Code Division Multiple Access)), and is connected to the Internet N2 via a wireless LAN (Local Area Network).

The mobile communication terminal 10 can also establish the above-mentioned wireless communication PPP-based communication link with a communication partner, and can transmit and receive packets with this communication partner through this communication link. More specifically, for example, as shown in FIG. 1, the mobile communication terminal 10 can transmit and receive packets by establishing a communication link with the fixed communication apparatus 20 that is connected to the communication networks N1, N2 via a wire line. As will be explained in more detail further below, PPP-based communication links of respectively different modes of wireless communications can be established between the mobile communication terminal 10 and fixed communication apparatus 20 here. That is, the communication system of this embodiment adopts a configuration that accords with a multilink PPP communication system.

The fixed communication apparatus 20 is a communication apparatus, which can be connected to a plurality of communications networks N1, N2 by wire lines, and which can carry out a plurality of respectively different modes of communications, and more specifically, for example, is equivalent to PPP access server. The fixed communication apparatus 20, as mentioned above, establishes PPP-based communication links (PPP connections) with the mobile communication terminal 10 via communication networks N1, N2, and uses these communication links to carry out communications.

Next, the functional configurations of the mobile communication terminal 10 and fixed communication apparatus 20 will be explained in detail. As shown in FIG. 1, the mobile communication terminal 10 comprises a W-CDMA communication modem 11; a wireless LAN adapter 12; a L2TP (Layer 2 Tunneling Protocol) virtual device 13; a PPP device 14; an IP layer 15; a valid wireless LAN searching portion 16; and a wireless LAN radio field intensity measuring portion 17. Furthermore, the mobile communication terminal 10 normally also has mobile telephone components in addition to the functional components mentioned above. The fixed communication apparatus 20 comprises an ISDN modem 21; an Ethernet (registered trademark) adapter 22; a L2TP virtual device 23; a PPP device 24; and an IP layer 25.

The W-CDMA communication modem 11 is communication accessing means, which carries out wireless communications using the W-CDMA mode, and which establishes this wireless communication PPP-based communication link with the fixed communication apparatus 20. More specifically, the W-CDMA communication modem 11 connects to the telephone network N1 via W-CDMA mode wireless communications, and via this telephone network N1 establishes a PPP-based communication link (PPP connection) by transmitting a PPP connection request to the fixed communication apparatus 20 connected to the telephone network N1. In the fixed communication apparatus 20, the ISDN (Integrated Services Digital Network) modem 21 has a function for connecting to the telephone network N1, receives the PPP connection request from the W-CDMA communication modem 11, and carries out processing for establishing a communication link with the W-CDMA communication modem 11. That is, the ISDN modem 21 of the fixed communication apparatus 20 is communicating means for establishing a PPP-based communication link for communications using the ISDN mode with a mobile communication terminal. An IP address related to the fixed communication apparatus 20 is set in the ISDN modem 21. Furthermore, when establishing the communication link, the W-CDMA communication modem 11 acquires the prescribed IP address. The communication link established by the W-CDMA communication modem 11 is combined and managed by the PPP device 14.

The wireless LAN adapter 12 is one function of wireless accessing means, which carries out wireless communications using the wireless LAN mode, and which connects to the Internet N2 (through the wireless LAN). The wireless LAN adapter 12 acquires an IP address from the Internet N2. The acquisition of the IP address is carried out via control that makes use of a protocol, such as DHCP (Dynamic Host Configuration Protocol), from the IP layer 15. As will be explained further below, this IP address is acquired for establishing the PPP-based communication link.

The L2TP virtual device 13 is one function of wireless accessing means, which uses the IP address acquired by the wireless LAN adapter 12 to establish a L2TP tunnel (L2 tunnel) with the fixed communication apparatus 20, and which establishes the PPP-based communication link by way of this L2TP tunnel. More specifically, the L2TP virtual device 13 establishes a L2TP tunnel by transmitting a L2TP connection request via the wireless LAN adapter over the Internet N2 to the fixed communication apparatus 20 connected to the Internet N2. In the fixed communication apparatus 20, the L2TP virtual device 23 carries out processing for receiving the L2TP connection request from the mobile communication terminal 10 via the Ethernet adapter 22 connected to the Internet N2, and establishing a L2TP tunnel with the L2TP virtual device 13.

Next, processing for establishing the PPP-based communication link between the L2TP virtual device 13 and Ethernet adapter 22 via the established L2TP tunnel is carried out. Furthermore, when establishing the communication link, the L2TP virtual device 23 acquires the same IP address as the IP address acquired by the W-CDMA communication modem 11 (This IP address differs from the IP address acquired by the wireless LAN adapter 12). This is because a plurality of communication links is combined into a single PPP device 14. The communication links established by the L2TP virtual device 13 are combined and managed by the PPP device 14.

That is, the Ethernet adapter 22 of the fixed communication apparatus 20 is one function of communicating means, which carries out communications using the Ethernet mode, and which connects to the Internet N2. An IP address related to the fixed communication apparatus 20 is set in the Ethernet adapter 22. Further, the L2TP virtual device 23 of the fixed communication apparatus 20 is connected to the Ethernet adapter 22, and as described hereinabove, is one function of communicating means, which uses the IP address set in the Ethernet adapter 22 to establish a L2TP tunnel (L2 tunnel) with the mobile communication terminal 10, and which establishes a PPP-based communication link by way of this L2TP tunnel.

As described above, two PPP-based communication links of the communication link established by the W-CDMA communication modem 11 and the communication links established by the wireless LAN adapter 12 and the L2TP virtual device 13 can be established for the mobile communication terminal 10.

Furthermore, when the L2TP virtual device 13 establishes a communication link (second communication link) at the time the PPP-based communication link (first communication link) is established by the W-CDMA communication modem 11, unlike a normal PPP connection, only the LCP (Link Control Protocol) step is carried out; authentication and NCP (Network Control Protocol) are omitted.

The PPP device 14 is combining means for combining the communication links established by the plurality of wireless accessing means. Consequently, the same IP address can be supplied by the plurality of PPP-based communication links. Furthermore, the combining of the plurality of communication links is carried out the same as multilink PPP.

The PPP device 14 transmits a packet inputted from the IP layer 15 to the fixed communication apparatus 20 via any of the established communication links, and also receives a packet received from the fixed communication apparatus 20 via any of the established communication links, and outputs this received packet to the IP layer 15. The PPP device 14 transmits and receives packets via the respective wireless accessing means (serial communication devices) 11, 12, 13. Therefore, the PPP device 14 can utilize a plurality of communication channels by maintaining pointers to the plurality of serial communication devices. Further, all of the serial communication devices maintain a common pointer to the PPP device 14, and a packet coming from any of the communication links can be received by a single PPP device 14. When a plurality of communication links has been established, the PPP device 14 sets a communication link from thereamong for use in packet transmission.

Further, the PPP device 14, as will be explained further below, is also controlling means for executing control so as to establish communication links for the wireless LAN adapter 12 and the L2TP virtual device 13 upon receiving a notification from the valid wireless LAN searching portion 16 to the effect that a wireless LAN access point that will make it possible for the wireless LAN adapter 12 to carry out communications has been detected (Also executes control over the IP layer 15 for IP address acquisition).

Further, the PPP device 14, as will be explained further below, also receives notification from the wireless LAN radio field intensity measuring portion 17 of the radio field intensity of the communication links established by the wireless LAN adapter 12 and the L2TP virtual device 13, and executes control on the basis of the radio field intensity thereof. The PPP device 14 detects that a pertinent communication link has become invalid based on the radio field intensity. More specifically, when the radio field intensity is lower than a predetermined threshold, or when the state is such that signals cannot be received, the PPP device 14 detects that the pertinent communication link has become invalid. That is, the PPP device 14 is one function of detecting means for detecting the fact that a communication link has become invalid.

Upon detecting that a communication link has become invalid, the PPP device 14 switches the packet-transmitting communication link to the communication link established by the W-CDMA communication modem 11. That is, the PPP device 14 is switching means for switching the packet-transmitting communication link based on the measured radio field intensity. Further, the PPP device 14 is notifying means for notifying the fixed communication apparatus 20 to the effect that the packet-transmitting communication link has been switched at the same time. The pertinent notification is carried out by transmitting a communication link change request to the fixed communication apparatus 20 via either the pre-switched or post-switched communication link. In addition, the PPP device 14 removes the communication link detected as being invalid.

Furthermore, the switching of the communication link described hereinabove is not necessarily carried out only when a communication link has become invalid, but rather can also be carried out when the measured radio field intensity is higher than a predetermined (first) switching threshold. Further, when the measured radio field intensity is higher than a predetermined (second) switching threshold, and, in addition, packets are being transmitted by the communication link established by the W-CDMA communication modem 11 at this time, switching can also be carried out to the communication links established by the wireless LAN adapter 12 and the L2TP virtual device 13.

The IP layer 15 is means for carrying out communication processing in accordance with the IP. More specifically, the IP layer 15 outputs packets to be transmitted to the PPP device 14, and also inputs received packets. Further, as described hereinabove, the IP layer 15 also acquires an IP address. Further, an API (Application Program Interface) from the IP layer 15 to the PPP device 14 is capable of selecting the packet-transmitting communication link. Consequently, the packet-transmitting communication link can also be selected by the higher-level layer (application layer) as well, accordance with the value and characteristics of the information to be transmitted.

Furthermore, a PPP device 24 and IP layer 25 are also comprised in the fixed communication apparatus 20, and have functions corresponding to the PPP device 14 and IP layer 15 of the mobile communication terminal 10. That is, the PPP device 24 is connected to the ISDN modem 21 and L2TP virtual device 23, and is combining means for combining communication links established by the ISDN modem 21, Ethernet adapter 22 and L2TP virtual device 23.

The valid wireless LAN searching portion 16 is means for searching for a wireless LAN access point (a valid wireless LAN access point) that will enable the wireless LAN adapter 12 to carry out communications. That is, the valid wireless LAN searching portion 16 is detecting means for detecting that wireless communications are possible using wireless accessing means. More specifically, the valid wireless LAN searching portion 16 monitors the wireless LAN adapter 12 and carries out the above-mentioned search to determine whether or not a signal is being received from a wireless LAN access point. When a wireless LAN access point that enables the wireless LAN adapter 12 to carry out communications is detected, the valid wireless LAN searching portion 16 notifies the PPP device 14 to this effect.

Furthermore, detecting whether or not wireless communication is possible can be carried out for at least one of the plurality of wireless accessing means 11, 12. For example, in this embodiment, it is detected that wireless communications are possible using wireless LAN, but similarly, a configuration in which it is detected that wireless communications are possible using the W-CDMA communication modem 11 can also be adopted.

The wireless LAN radio field intensity measuring portion 17 is measuring means for measuring the radio field intensity of the communication links established by the wireless LAN adapter 12 and the L2TP virtual device 13. The wireless LAN radio field intensity measuring portion 17 notifies the PPP device 14 of the measured radio field intensity. The radio field intensity information is used to detect that a communication link has become invalid. That is, the wireless LAN radio field intensity measuring portion 17 is one function of detecting means for detecting that an established communication link has become invalid. Further, the radio field intensity information is used to determine whether or not to switch the packet-transmitting communication link. The preceding is the functional configuration of the mobile communication terminal 10 related to this embodiment.

Figure 2:
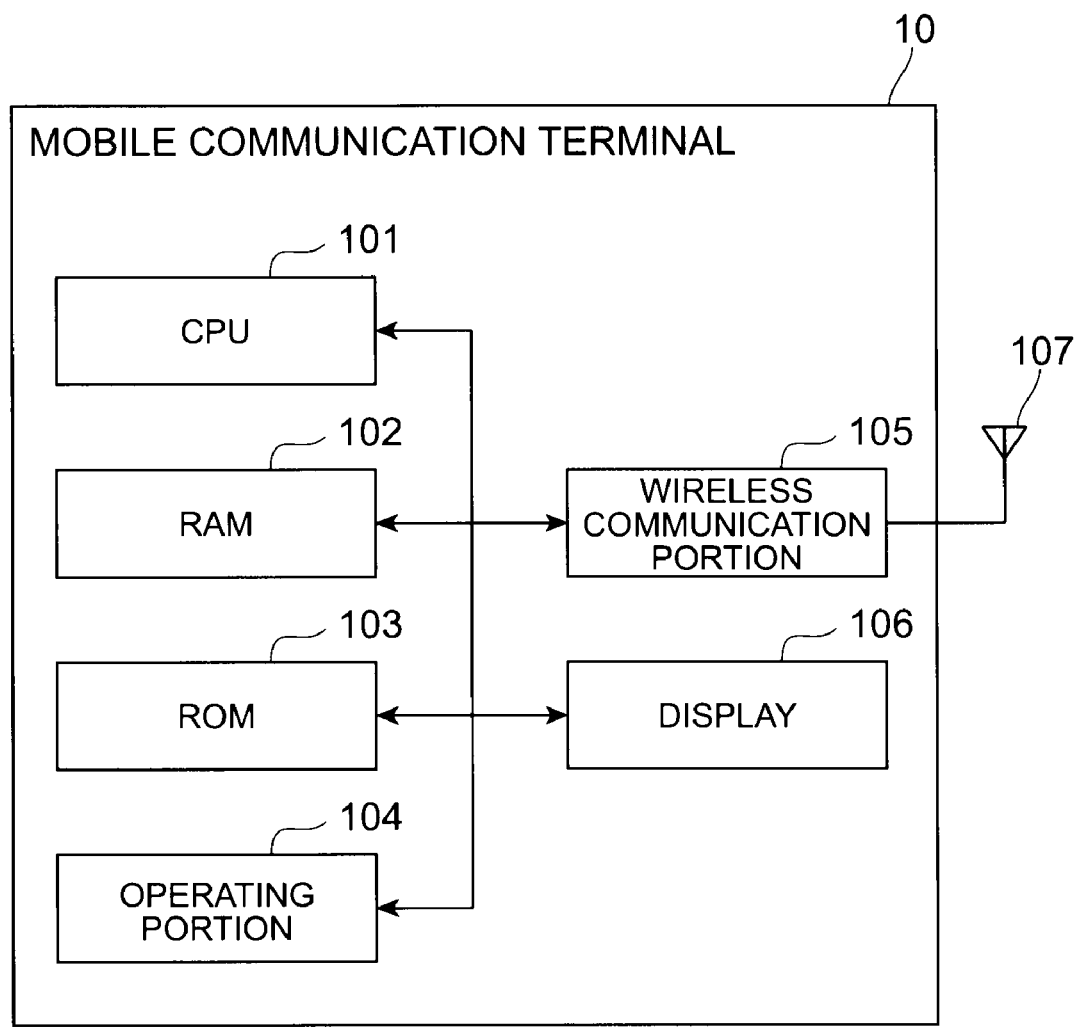
FIG. 2 is a diagram showing the hardware configuration of the mobile communication terminal related to an embodiment of the present invention.

FIG. 2 shows the hardware configuration of the mobile communication terminal 10. As shown in FIG. 2, the mobile communication terminal 10 is comprised of hardware, such as a CPU (Central Processing Unit) 101; RAM (Random Access Memory) 102 and ROM (Read Only Memory) 103, which are the main memory devices; an operating portion 104; wireless communication portion 105; display 106; and antenna 107. Furthermore, the wireless communication portion 105 is normally provided for each wireless communication mode. The respective functions of the mobile communication terminal 10, which were described hereinabove, and which will be explained further below, are realized by operating these components.

Figure 8:
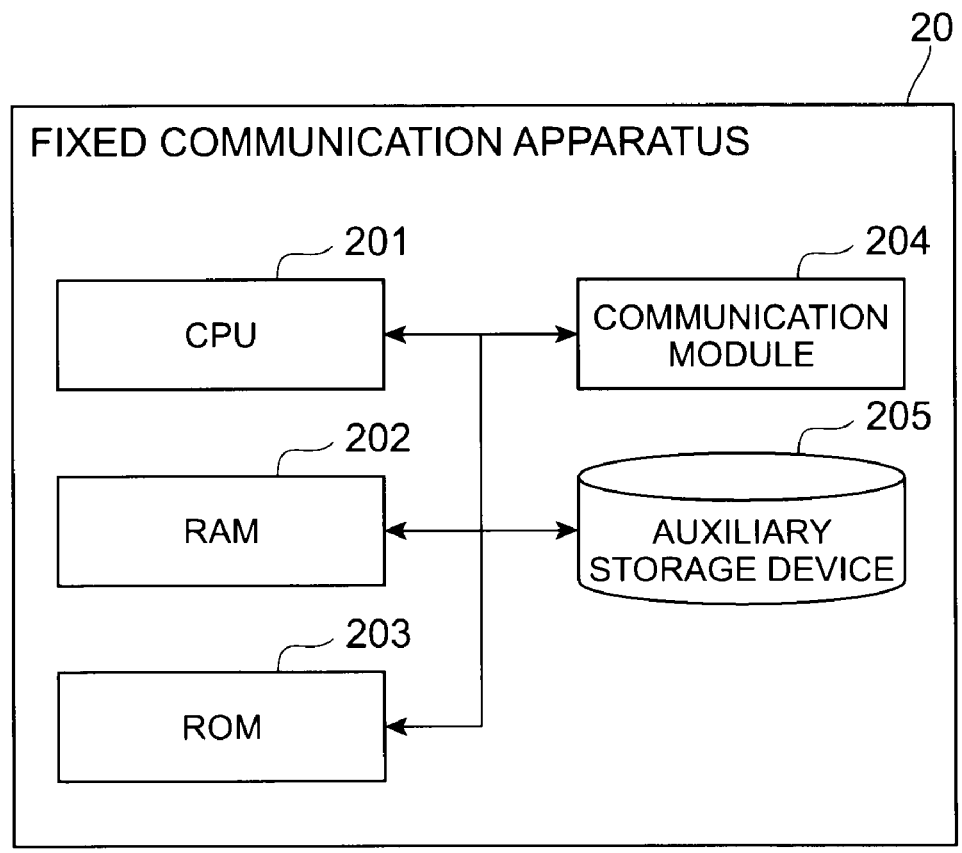
FIG. 8 is a diagram showing the hardware configuration of a fixed communication apparatus related to an embodiment of the present invention.

FIG. 8 shows the hardware configuration of the fixed communication apparatus 20. As shown in FIG. 8, the fixed communication apparatus 20 is configured as a computer comprising hardware, such as a CPU 201; RAM 202 and ROM 203, which are the main storage devices; a communication module 204, which is a data transmitting/receiving device, such as a network card; and an auxiliary storage device 205, such as a hard disk. The functions of the fixed communication apparatus 20, which were described hereinabove, and which will be explained further below, are realized by operating these components.

Next, the process (mobile communication method), which is executed in the mobile communication terminal 10 (and fixed communication apparatus 20) related to this embodiment, will be explained using the processing sequences of FIGS. 3 through 5. This process is carried out when the mobile communication terminal 10, triggered by the user operating the mobile communication terminal 10, carries out the transmitting and receiving of packets with the fixed communication apparatus 20 using PPP-based communication links. The fixed communication apparatus 20 is also specified as the communication partner at this time.

In the mobile communication terminal 10, a PPP connection request is transmitted to the fixed communication apparatus 20 via the telephone network N1 by the W-CDMA communication modem 11 (S101). In the fixed communication apparatus 20, the pertinent PPP connection request is received by the ISDN modem 21 (S131), and a first PPP connection is established between the mobile communication terminal 10 and the fixed communication apparatus 20. The established first PPP connection is managed by the PPP device 14. Further, the PPP device 14 sets the first PPP connection as the packet-transmitting communication link at this time.

Communications between the mobile communication terminal 10 and the fixed communication apparatus 20 commence using this first PPP connection. However, since the bandwidth of the W-CDMA communication link is narrow, once it becomes possible to use the wireless LAN, it is better to switch to and use the wider bandwidth wireless LAN communication link for communications. Thus, the following processing is carried out in this embodiment.

In the mobile communication terminal 10, the valid wireless LAN searching portion 16 searches for a valid access point (S102: detection step). This search is carried out continually. The mobile communication terminal 10 moves inside the wireless LAN service area, and when the valid wireless LAN searching portion 16 detects a valid access point, a notification to this effect is sent from the valid wireless LAN searching portion 16 to the PPP device 14 (S103: control step). When a valid access point is not detected (S103), the search for an access point is carried out repeatedly.

When a valid access point is detected by the PPP device 14, a process for establishing a second PPP connection is carried out as follows under the control of the PPP device 14. First, the IP layer 15 uses DHCP or another such protocol to acquire an IP address for the wireless LAN adapter 12. Next, a L2TP connection request for establishing a L2TP tunnel between the above-mentioned IP address and the IP address allocated to the Ethernet adapter 22 of the fixed communication apparatus 20 is transmitted from the L2TP virtual device 13 to the fixed communication apparatus 20 (S104: control step). In the fixed communication apparatus 20, the L2TP virtual device 23 receives the L2TP connection request via the Ethernet adapter 22, and establishes the L2TP tunnel (S132).

Next, in the mobile communication terminal 10, the L2TP virtual device 13 transmits via the L2 tunnel to the fixed communication apparatus 20 a PPP connection request for a second PPP connection (S105: control step). In the fixed communication apparatus 20, the L2TP virtual device 23 receives the PPP connection request via the Ethernet adapter 22, and establishes a second PPP connection between the mobile communication terminal 10 and the fixed communication apparatus 20 (S133). The IP address related to the second PPP connection here is the same as the IP address related to the first PPP connection.

Next, in the mobile communication terminal 10, the PPP device 14 combines the second PPP connection with the first PPP connection (S106: combination step). Further, the PPP device 14 switches the packet-transmitting communication link from the first PPP connection (W-CDMA communication link) to the second PPP connection (wireless LAN communication link) (S107: switching step). In the meantime, in the fixed communication apparatus 20 as well, the PPP device 24 combines the second PPP connection with the first PPP connection (S134: combination step).

Next, in the mobile communication terminal 10, the PPP device 14 transmits to the fixed communication apparatus 20 a request to change the link to the wireless LAN communication link (S108: notification step). In the fixed communication apparatus 20, the PPP device 24 receives the pertinent change link request, and switches the packet-transmitting communication link from the first PPP connection (W-CDMA communication link) to the second PPP connection (Internet communication link) (S135).

In accordance with the series of processes described hereinabove, the mobile communication terminal 10, triggered by entering into a wireless LAN service area, is able to switch PPP-based communication to the wireless LAN, making possible broadband communications.

Next, an example of when the mobile communication terminal 10 moves outside the wireless LAN service area will be explained by referring to the processing sequence of FIG. 4.

In the mobile communication terminal 10, the wireless LAN radio field intensity measuring portion 17 regularly measures the radio field intensity during communications from the wireless LAN access point being used for communication. The wireless LAN radio field intensity measuring portion 17 notifies the PPP device 14 of the measured radio field intensity. Next, the PPP device 14, which received the notification, determines if the radio field intensity is lower than a predetermined threshold, or if it is a state in which its own terminal 10 is unable to receive the signal (invalid) (S111: measurement step, detection step). When the determination is that the radio field intensity is not lower than the predetermined threshold, and, in addition, the state is not one in which its own terminal 10 is unable to receive the signal, the wireless LAN radio field intensity measuring portion 17 continues measuring the radio field intensity.

When the determination is that it is not a state in which either the radio field intensity is lower than the predetermined threshold, or its own terminal 10 cannot receive the signal, the PPP device 14 switches the packet-transmitting communication link from the second PPP connection (wireless LAN communication link) to the first PPP connection (W-CDMA communication link). Further, in so doing, the PPP device 14 removes the second PPP connection (S112: switching step, removal step).

In line with this, in the mobile communication terminal 10, the PPP device 14 transmits to the fixed communication apparatus 20 a request to change the link to the W-CDMA communication link (S113: notification step). In the fixed communication apparatus 20, the PPP device 24 receives the pertinent change link request, and switches the packet-transmitting communication link from the second PPP connection (Internet communication link) to the first PPP connection (W-CDMA communication link) (S141).

Next, in the mobile communication terminal 10, the L2TP virtual device 13 transmits to the fixed communication apparatus 20 a PPP disconnect request for the second PPP connection, and disconnects the second PPP connection (S114: control step). In the fixed communication apparatus 20, the L2TP virtual device 23 receives the PPP disconnect request, and disconnects the second PPP connection (S142).

Next, in the mobile communication terminal 10, a request to disconnect the L2TP tunnel is transmitted from the L2TP virtual device 13 to the fixed communication apparatus 20 (S115: control step). In the fixed communication apparatus 20, the L2TP virtual device 23 receives the L2TP tunnel disconnect request, and disconnects L2TP tunnel (S143).

Figure 3:
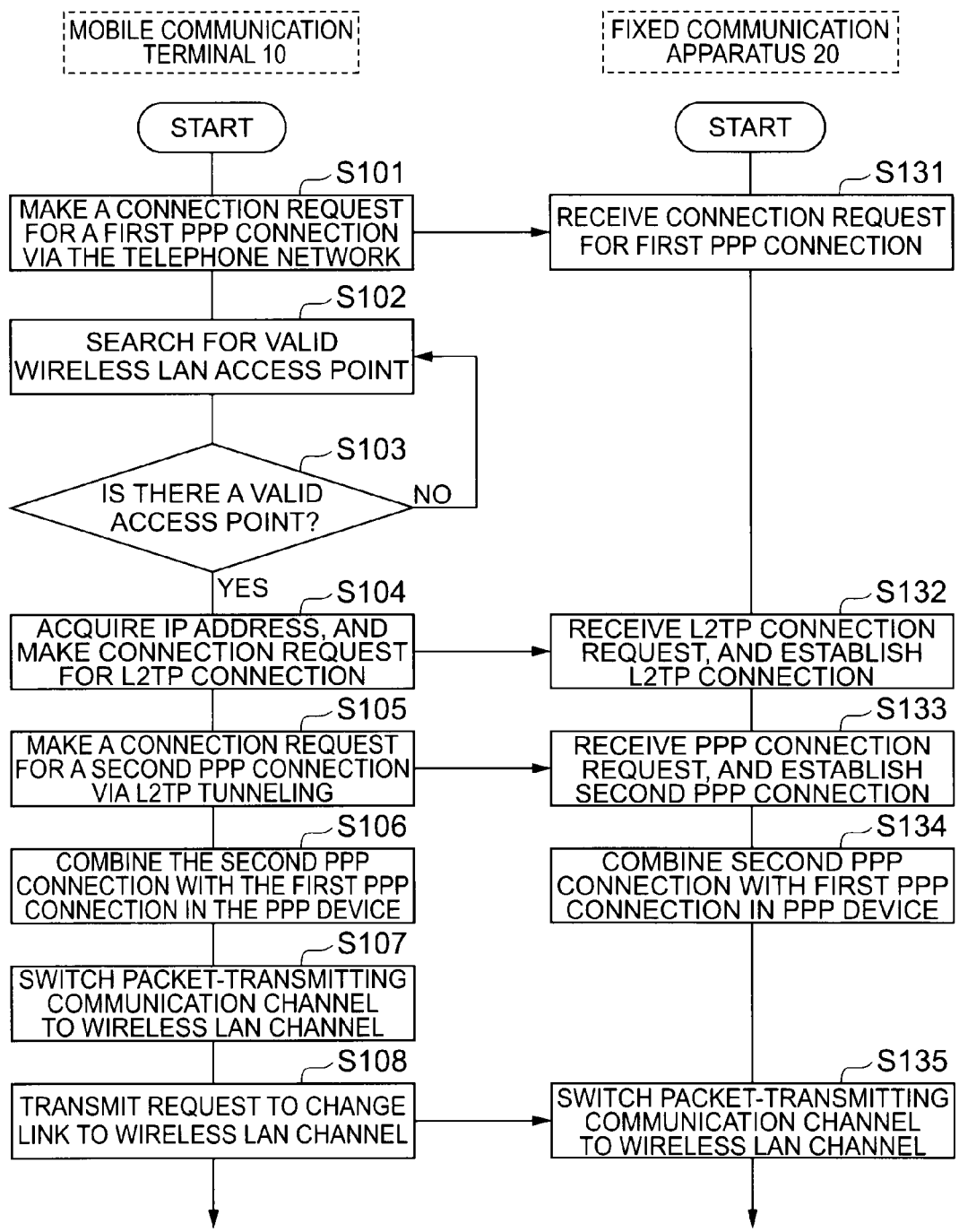
FIG. 3 is a processing sequence showing the process (mobile communication method) executed by the mobile communication terminal related to an embodiment of the present invention.

In accordance with the above-described processing, the mobile communication terminal 10 constitutes a state in which only the first PPP connection (W-CDMA communication link) is established (the state prior to S102 shown in FIG. 3). The mobile communication terminal 10 thereafter returns to the processing of S102 shown in FIG. 3. If a newly validated wireless LAN access point is detected in S102, the processing of the above-described S104 and thereafter is carried out.

In accordance with the series of processes described hereinabove, the mobile communication terminal 10 can appropriately maintain PPP communications by updating valid wireless LAN access even while moving.

Figure 4:
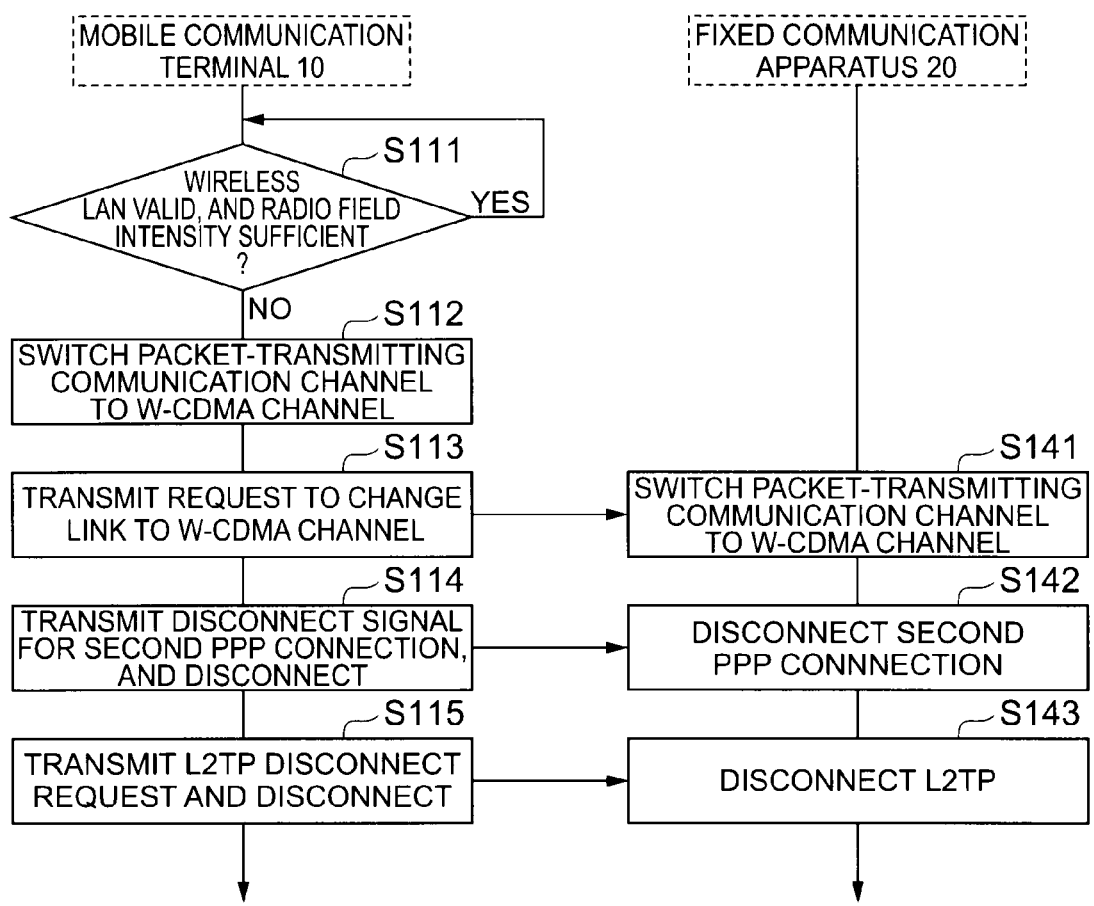
FIG. 4 is a processing sequence showing the process (mobile communication method) executed by the mobile communication terminal related to an embodiment of the present invention.

In the processing explained using FIG. 4, an example was given in which, when the radio field intensity of the wireless LAN becomes weak, the second PPP connection and the L2TP tunnel are disconnected, and processing moves to a step that searches for a newly validated wireless LAN access point, but it is also possible to carry our the processing up to S113 (without carrying out the processing of S114 and S115), and to maintain the second PPP connection. In this case, the process shown in the processing sequence of FIG. 5 is carried out. Further, in this case, the process for removing the wireless LAN communication link described hereinabove is not carried out.

Figure 5:
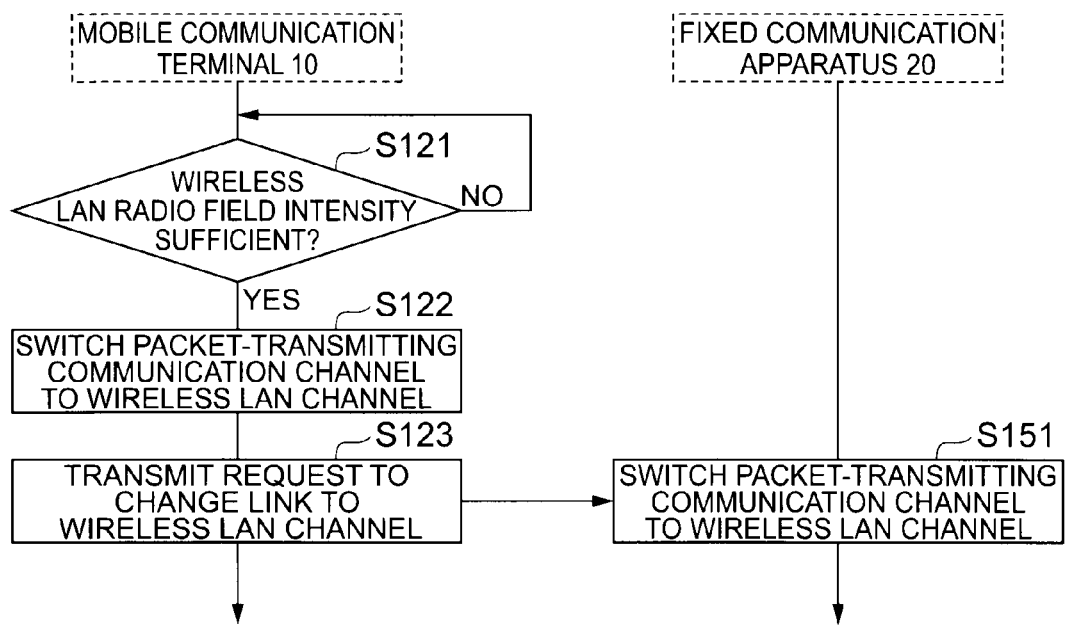
FIG. 5 is a processing sequence showing the process (mobile communication method) executed by the mobile communication terminal related to an embodiment of the present invention.

As shown in FIG. 5, thereafter, in the mobile communication terminal 10, the wireless LAN radio field intensity measuring portion 17 regularly measures the radio field intensity of the wireless LAN communication link being maintained as the second PPP connection. The measured radio field intensity is notified to the PPP device 14 from the wireless LAN radio field intensity measuring portion 17. Next, the PPP device 14 that receives the notification determines if the radio field intensity is higher than a predetermined (the above-described second) switching threshold (S121: measurement step). When the determination is that the radio field intensity is not higher than the predetermined switching threshold, the wireless LAN radio field intensity measuring portion 17 continues to measure the radio field intensity.

When the determination is that the radio field intensity is higher than the predetermined switching threshold, the PPP device 14 switches the packet-transmitting communication link from the first PPP connection (W-CDMA communication link) to the second PPP connection (wireless LAN communication link) (S122: switching step).

In line with this, in the mobile communication terminal 10, the PPP device 14 transmits a request to the fixed communication apparatus 20 to change the link to the Internet communication link (S123: notification step). In the fixed communication apparatus 20, the PPP device 24 receives the pertinent change link request, and changes the packet-transmitting communication link from the first PPP connection (W-CDMA communication link) to the second PPP connection (Internet communication link) (S151). Thereafter, the processing of the above-described S111 and thereafter is repeatedly carried out.

In accordance with the series of processes described hereinabove, the mobile communication terminal 10 can appropriately maintain PPP communications by switching to a desirable communication link as the need arises without disconnecting the wireless LAN-based PPP connection.

Figure 6:
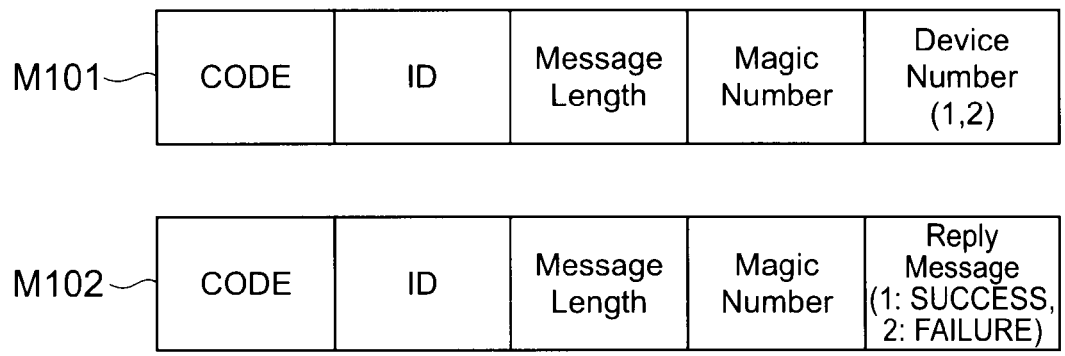
FIG. 6 is a diagram showing an example of the information used when notifying that the packet-transmitting communication link has been switched.

Next, the information, which is used when notifying that the packet-transmitting communication link has been switched, and which is transmitted and received between the mobile communication terminal 10 and the fixed communication apparatus 20 will be explained. A PPP LCP negotiation message is used for the pertinent notification. FIG. 6 shows examples of a change link request message M101 and a response message M102. The change link request message M101 stores a value denoting a change link request in the Code field that shows the command code. This message M101 also specifies a device number in the data field. In this example, "1" is the first PPP connection, and "2" is the second PPP connection. The response message M102 to the change link request message M101 stores a value denoting the response to the change link request in the Code field. Then, the response message M102 stores a value denoting whether the link change succeeded or failed in the data field.

Figure 7:
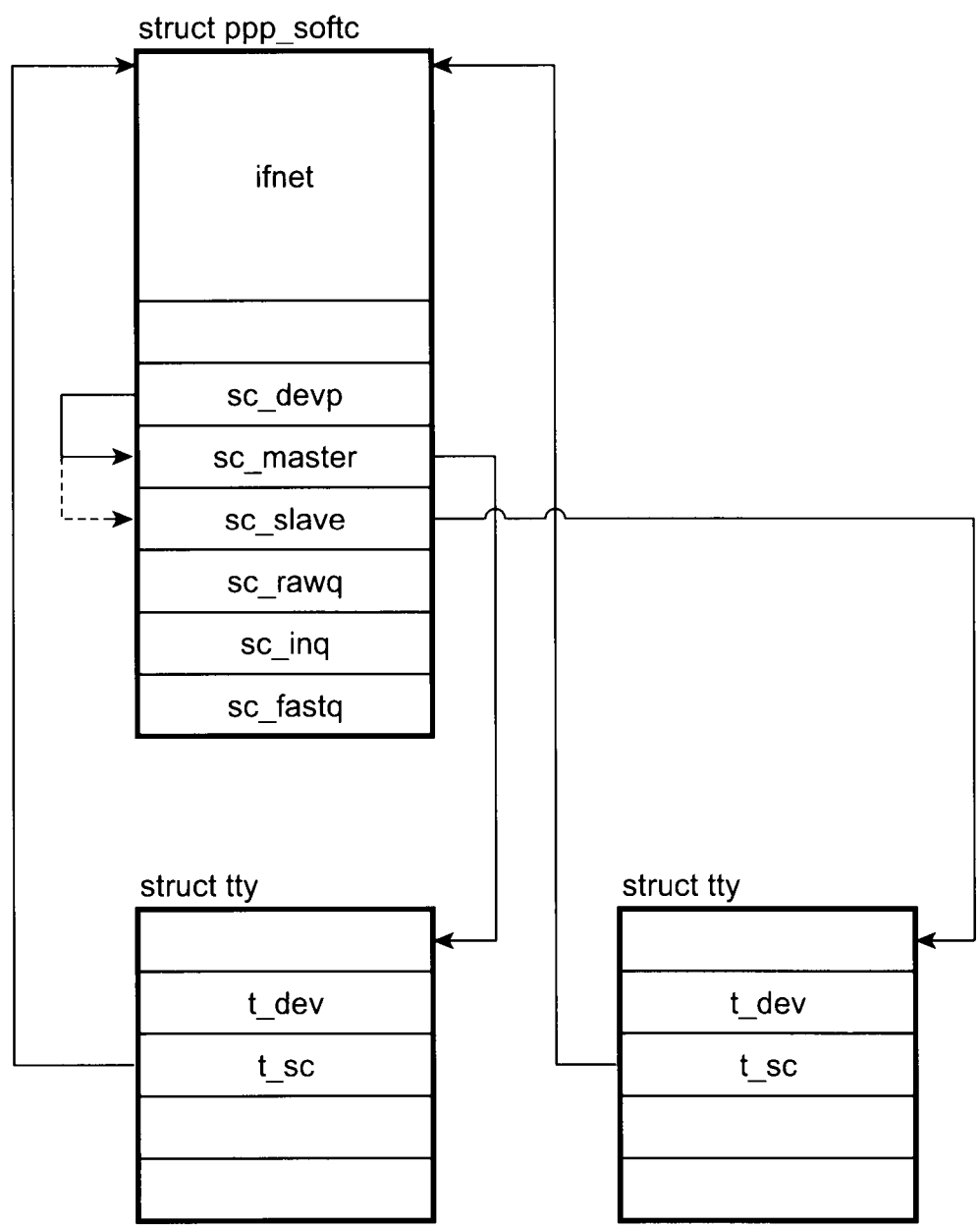
FIG. 7 is a diagram showing the data structure of a PPP device driver managed by a PPP device.

Next, FIG. 7 shows the data structure of a PPP device driver, which is managed by the PPP device 14 to realize the mobile communication terminal 10 of this embodiment. In Free BSD 4.11R, the PPP device driver holds data in a structure called ppp_softc. The ppp_softc structure holds an ifnet structure comprising IP address information and the like; sc_devp, which is a pointer to a tty structure used in the communication link; sc_rawq, which is the received packet queue; sc_inq, which is the received packet queue for PPP control; and sc_fastq, which is the transmitted packet queue. Further, since a plurality of communication links are held by one ppp_softc and are switched arbitrarily, this embodiment adds sc_master and sc_slave, and they each serve as a pointer to a single communication link (tty structure). The sc_devp serves as the pointer to either sc_master or sc_slave to select which communication link is to be used. In this embodiment, two types of communication links are used, but even if three or more types of communication links are used, this embodiment can be realized in the same way by simply adding a pointer to the third type communication link. The tty structure of each communication link has a back-pointer t_sc to the ppp_softc structure that manages the pertinent communication link. In the case of PPP multilink, which realizes a plurality of communication channels, the t_sc of a plurality of tty structures serve as pointers to the same ppp_softc structure. Therefore, packets received from a plurality of communication links can be placed in the received packet queue sc_rawq of the same ppp_softc structure.

The selection of the packet-transmitting communication link can be switched by setting the sc_devp pointer to either the sc_master or the sc_slave. This switching can be carried out by a control system call ioct1 to the communication link device shown below.

int ioct1 (int d, PPPIOSCDEVICE, int dev_id)

An ID called PPPIOSCDEVICE is added to the second argument of the ioct1, making it possible to select the communication link specified in the third argument for the PPP device 14 related to the communication link device specified in the first argument.

Further, a control ID like the following PPPIOCMUNIT is added to combine a plurality of communication links in a single PPP device, causing the communication link established by PPP device 14 of the unit number specified in the third argument to combine in PPP device 14, which is related to the communication link device specified in the first argument.

int ioct1 (int d, PPPIOCMUNIT, int unit)

Adding these device control system calls makes it possible to combine and select a communication link from pppd, which is the PPP control daemon, and another application, and enables the selection of a communication link in accordance with the value and characteristic of information at the application level.

As described above, according to this embodiment, PPP-based communication links for respectively different modes of wireless communications are established between communication partners by a plurality of wireless accessing means: the W-CDMA communication modem 11, wireless LAN adapter 12 and L2TP virtual device 13, and the established communication links are combined. Consequently, communications are carried out using a plurality of communication links as a single communication channel.

Further, in this embodiment, it is detected that communication by the wireless LAN adapter 12 is possible, and the wireless LAN adapter 12 and L2TP virtual device 13 establish communication links. Consequently, according to this embodiment, since it is possible to combine continually valid communication links, which are capable of communication, it is possible to appropriately maintain PPP-based communications even in an environment in which the terminal moves and the communication environment continually changes.

Further, as in this embodiment, if a L2 tunnel is established between a communication partner, and a communication link is established via this L2 tunnel, it is possible to establish a communication link even when a PPP-based communication link cannot be established directly via the Internet. Consequently, communication link redundancy can be enhanced, and this also makes it possible to appropriately maintain communications.

Further, as in this embodiment, the management of communication links can be appropriately carried out in the mobile communication terminal 10 if a communication link is detected to be invalid and removed from the bundle.

Further, as in this embodiment, the switching of the packet-transmitting communication link based on the radio field intensity makes it possible to prevent packet loss due to radio field intensity degradation and to efficiently and appropriately transmit packets to the communication partner.

Furthermore, in this embodiment, only the communication link of the wireless LAN is targeted for control, but it is not always necessary to adopt this configuration, and the W-CDMA communication link can be targeted for control the same as the wireless LAN communication link, or the W-CDMA communication link alone can be targeted for control.

Further, in this embodiment, packet transmission is carried out over a single communication link, but it is not always necessary to carry out packet transmission via just one communication link, and, for example, when the communication status of any of a plurality of established communication links is good, packet transmission can be carried out via a plurality of communication links the same as with conventional multilink PPP.

Next, a mobile communication terminal 10 and a fixed communication apparatus 20a related to a second embodiment of the present invention will be explained.

Figure 9:
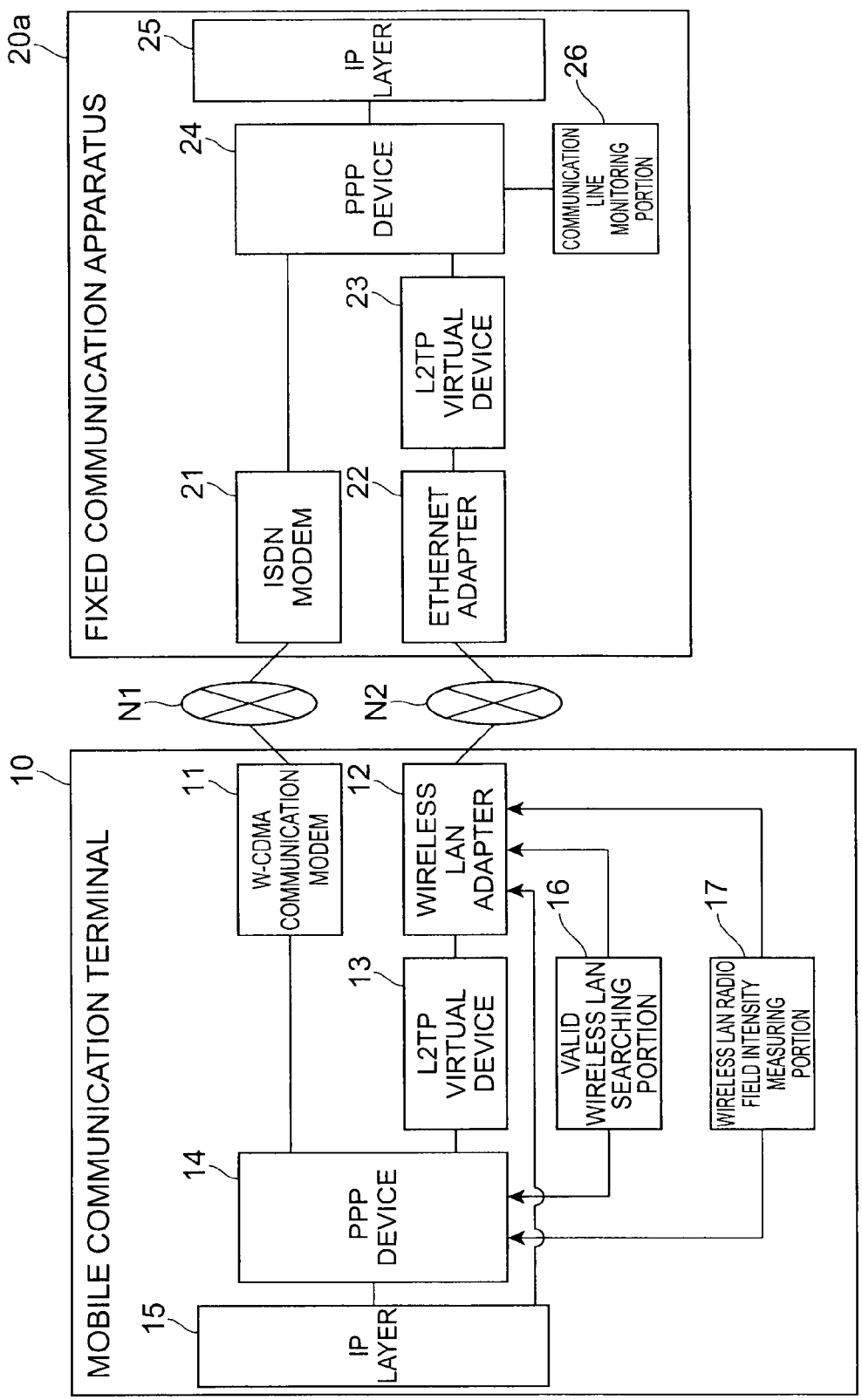
FIG. 9 is a diagram showing the functional configuration of a mobile communication terminal related to a second embodiment of the present invention.

FIG. 9 shows the configuration of a mobile communication terminal 10 and a fixed communication apparatus 20a related to this embodiment. The basic configurations of the mobile communication terminal 10 and the fixed communication apparatus 20a related to this embodiment are the same as that of the mobile communication terminal 10 and fixed communication apparatus 20 of the embodiment described hereinabove. As shown in FIG. 9, the fixed communication apparatus 20a related to this embodiment further comprises a communication line monitoring portion 26. The communication line monitoring portion 26 is connected to the PPP device 24, and can transmit/receive information to/from the PPP device 24, and also monitor the ISDN modem 21 via the below-described PPP device 24.

The communication line monitoring portion 26 is means for monitoring the number of telephone network N1-based PPP connections established by the ISDN modem 21. That is, the communication line monitoring portion 26 is monitoring means for monitoring the communication status of at least one communication of the plurality of communicating means in its own apparatus 20a. The monitored communication status, for example, corresponds to the utilization status (the number of establish PPP connections) of the communication line as described hereinabove.

The communication line monitoring portion 26 is communication link change requesting means for requesting the mobile communication terminal 10, which constitutes the communication partner, to change the packet-transmitting communication link based on the above-mentioned number of PPP connections being monitored. More specifically, the function is as follows. The communication line monitoring portion 26 stores in advance the maximum allowable number of PPP connections related to the number of PPP connections via the telephone network N1. As used here, the maximum allowable number of PPP connections is the number of PPP connections that (the ISDN modem 21 of) the fixed communication apparatus 20a is capable of receiving at the same time from the telephone network N1. The communication line monitoring portion 26 carries out the following processing when a telephone network N1-based PPP connection has been established between the mobile communication terminal 10 and its own apparatus 20a, and the ISDN modem 21 receives a PPP connection request via the telephone network N1 from a different communication device (to include a different mobile communication terminal 10). Furthermore, when a PPP connection request is received, a notification to this effect is communicated to the communication line monitoring portion 26 from the ISDN modem 21 via the PPP device 24.

The communication line monitoring portion 26 compares the number of PPP connections currently being monitored to the maximum allowable number of PPP connections, and determines whether or not there is enough free capacity for PPP connections via the telephone network N1. For example, if the maximum allowable number of PPP connections is 2, and the current number of PPP connections is 1, a determination is made that the free capacity is 1, and that there is sufficient free capacity. Conversely, if the current number of PPP connections is 2, a determination is made that free capacity is 0, and that there is insufficient free capacity. When the determination is that the free capacity for PPP connections is sufficient, the communication line monitoring portion 26 instructs the ISDN modem 21 as usual to establish a PPP connection with the communication device that transmitted the PPP connection request.

When the determination is that PPP connection free capacity is insufficient, the communication line monitoring portion 26 requests (change link request) that the mobile communication terminal 10, to which the telephone network N1-based PPP connection has been established, change the packet-transmitting communication link. More specifically, for example, it is a request for a change that shifts from the telephone network N1 to a different communication network, such as the Internet N2. The above-cited change request is carried out by transmitting a signal related to this request via the telephone network N1 (by the ISDN modem 21 as a result of the control of the communication line monitoring portion 26).

Further, as will be explained further below, the PPP device 24 receives a change link request transmitted from the mobile communication terminal 10 in response to the above-mentioned request, and switches the packet-transmitting communication link from the first PPP connection (W-CDMA communication link) to the second PPP connection (Internet communication link). Further, the communication line monitoring portion 26, after changing the communication link as described hereinabove, instructs the ISDN modem 21 to establish a PPP connection with the communication device that transmitted the PPP connection request as usual. The preceding is the configuration of the fixed communication apparatus 20a related to this embodiment.

To support the above-described fixed communication apparatus 20a, the mobile communication terminal 10 related to this embodiment has the following function in addition those of the mobile communication terminal 10 of the previous embodiment. The W-CDMA communication modem 11 also functions as communication link change receiving means for receiving a request to change communications carried out from the fixed communication apparatus 20a. More specifically, the W-CDMA communication modem 11 receives the pertinent change request signal transmitted from the fixed communication apparatus 20a as described hereinabove. The W-CDMA communication modem 11 notifies the PPP device 14 to the effect that a change communication request was received.

The PPP device 14 also functions as switching means for switching the packet-transmitting communication link based on the communication link change request received by the W-CDMA communication modem 11. When an Internet N2-based PPP connection (the second PPP connection in the previous embodiment) has been established between its own terminal 10 and the fixed communication apparatus 20a, the PPP device 14 sets this PPP connection as the communication link to be used in packet transmission.

When an Internet N2-based PPP connection has not been established between its own terminal 10 and the fixed communication apparatus 20a, the PPP device 14 establishes an Internet N2-based PPP connection between its own terminal 10 and the fixed communication apparatus 20a, and thereafter sets this PPP connection as the communication link to be used in packet transmission. Next, the PPP device 14 transmits a request to the fixed communication apparatus 20a to change the link to the wireless LAN communication link the same as in the previous embodiment. The preceding is the configuration of the mobile communication terminal 10 related to this embodiment.

Figure 10:
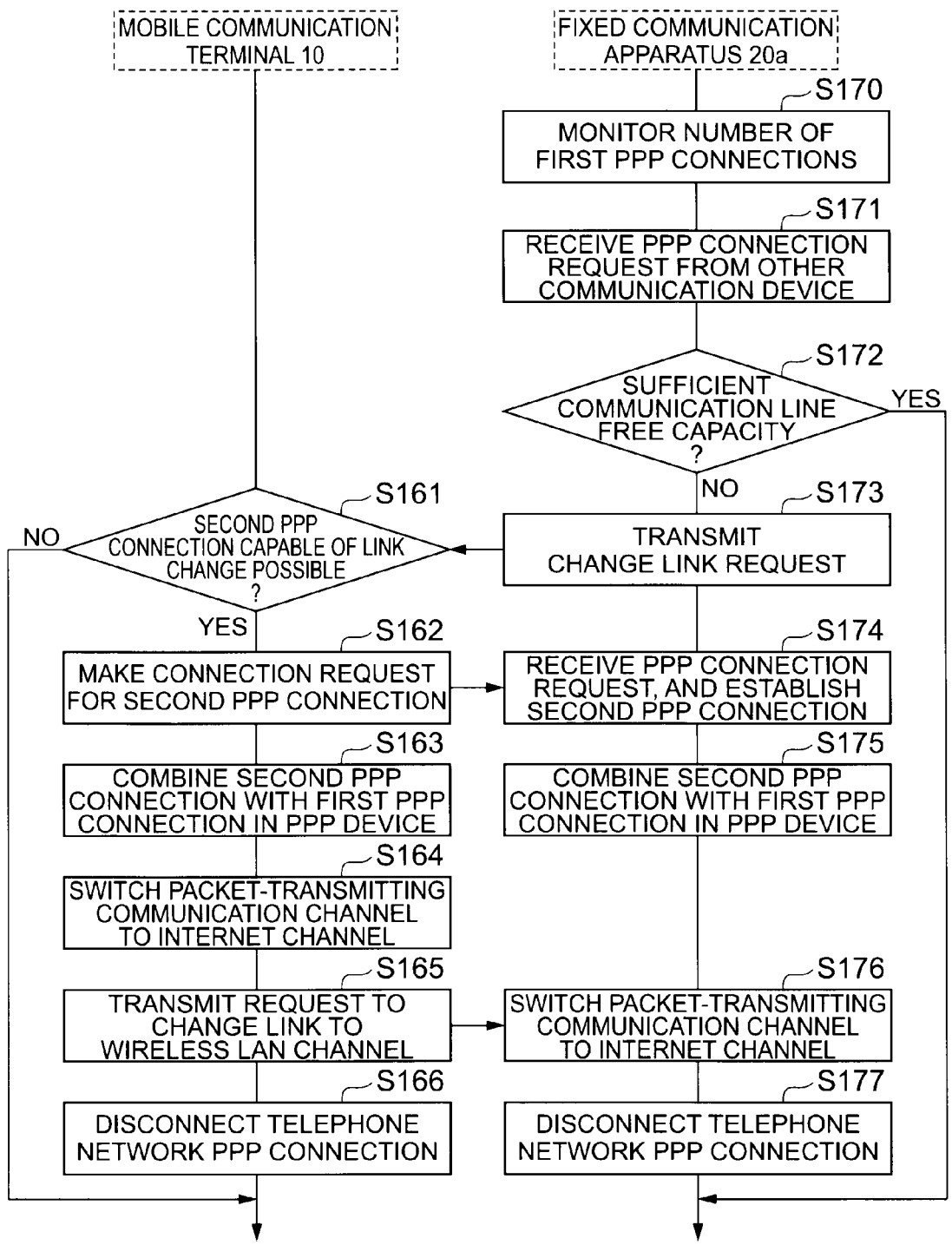
FIG. 10 is a processing sequence showing the processes (mobile communication method and communication method) executed by the mobile communication terminal and fixed communication apparatus related to an embodiment of the present invention.

Next, the processes (mobile communication method and communication method) executed in the mobile communication terminal 10 and fixed communication apparatus 20a related to this embodiment will be explained using the processing sequence of FIG. 10. Here, a telephone network N1-based PPP connection (first PPP connection) is established between the mobile communication terminal 10 and the fixed communication apparatus 20a, but an Internet N2-based PPP connection (second connection) is not established.

In the fixed communication apparatus 20a, the communication line monitoring portion 26 monitors the number of first PPP connections established by the ISDN modem 21 (S170: monitoring step). Furthermore, monitoring the number of PPP connections is carried out regularly (for example, at fixed intervals) rather than at a predetermined timing.

Here, a PPP connection request is sent to the fixed communication apparatus 20a from a different communication device than the above-described mobile communication terminal 10. In the fixed communication apparatus 20a, the ISDN modem 21 receives the pertinent PPP connection request (S171). Next, the communication line monitoring portion 26 compares the number of PPP connections currently being monitored against the maximum allowable number of PPP connections, and determines whether or not there is sufficient free capacity for a first PPP connection (S172: communication link change request step). When the determination is that there is sufficient free capacity for a first PPP connection, the following processing is not carried out.

When the determination is that there is not sufficient free capacity for a first PPP connection, a request is made to the mobile communication terminal 10 with which the first PPP connection has been established in accordance with (the control) of the communication line monitoring portion 26 to change the packet-transmitting communication link (S173: communication link change request step). Furthermore, the mobile communication terminal 10 for which the communication link change request is carried out (that is, the target of the communication link change) is decided on the basis of a prescribed rule stored (in communication line monitoring portion 26 of) the fixed communication apparatus 20a. For example, the request is made to the mobile communication terminal 10 to which the first communication link was established the earliest (that is, with which the first communication link has been established the longest).

In the mobile communication terminal 10, the W-CDMA communication modem 11 receives the above-mentioned request (S161: communication link change receiving step). Next, in the mobile communication terminal 10, the PPP device 14 in line with the change link request determines whether or not it is possible to establish a second PPP connection to which the link can be changed (S161: detection step, switching step). In this embodiment, the PPP device 14 determines whether or not wireless LAN-based wireless communication by the wireless LAN adapter 12 is valid. When the determination is that a second PPP connection cannot be established, the following processing is not carried out in the mobile communication terminal 10.

When the determination is that a second PPP connection can be established, a PPP connection request for a second PPP connection is transmitted under the control of the PPP device 14 to the fixed communication apparatus 20a by the L2TP virtual device 13 the same as in the previous embodiment (S162: control step, switching step). In the fixed communication apparatus 20a, the L2TP virtual device 23 receives the PPP connection request via the Ethernet adapter 22, and establishes a second PPP connection between the mobile communication terminal 10 and the fixed communication apparatus 20a (S174).

Next, in the mobile communication terminal 10, the PPP device 14 combines the second PPP connection and the first PPP connection (S163: combination step, switching step). Further, the PPP device 14 switches the packet-transmission communication link from the first PPP connection to the second PPP connection (S164: switching step). In the meantime, in the fixed communication apparatus 20a as well, the PPP device 24 combines the second PPP connection and the first PPP connection (S175: combination step).

Next, in the mobile communication terminal 10, the PPP device 14 transmits a request to the fixed communication apparatus 20a to change the link to the wireless LAN communication link (S165: notification step). In the fixed communication apparatus 20a, the PPP device 24 receives the pertinent change link request, and switches the packet-transmitting communication link from the first PPP connection (W-CDMA communication link) to the second PPP connection (Internet communication link) (S176).

Next, in the mobile communication terminal 10 and fixed communication apparatus 20a, the first PPP connection is disconnected (S166, S177). Further, in the fixed communication apparatus 20a, the processing for establishing a PPP connection to the communication terminal related to PPP connection request received in S171 is carried out thereafter (not shown in the figure).

In accordance with the series of processes described hereinabove, the mobile communication terminal 10 can shift the communication link that the mobile communication terminal 10 is using to a communication link that goes by way of a different communication network while maintaining communications with a mobile communication terminal 10 with which communications are in progress. The above-mentioned change of communication links is carried out in accordance with the communication status, such as the utilization status of the communication line. Therefore, according to this embodiment, it is possible to make efficient use of the communication line, and it is possible for the mobile communication terminal 10 to efficiently and appropriately transmit packets to the fixed communication apparatus 20a, which is the communication partner.

Furthermore, in the embodiments described hereinabove, a determination for changing the communication link is made when a PPP connection request is received from the mobile communication terminal 10, but the above-mentioned determination can also be carried out (without triggering the PPP connection request) when a plurality of communication links have already been established. Further, it is supposed that the number of established PPP connections is used in the above-mentioned determination, but an index denoting another communication status related to communicating means can also be used in the above-mentioned determination. Further, the change of communication links was a change from a PPP connection via the telephone network N1 to PPP connection via the Internet N2, but the opposite change can also be carried out in accordance with the status of communications. In this case, the communication status of the Internet N2 will be monitored.

What is claimed is:

1. A mobile communication terminal comprising:
a plurality of wireless accessing means for establishing PPP-based (Point-to-Point Protocol-based) communication links for respectively different modes of wireless communications with a communication partner, one of the wireless accessing means from the plurality of wireless accessing means acquiring an IP address, used to establish a L2 (Layer 2) tunnel with the communication partner, and establishing a communication link via the L2 tunnel;
combining means for combining the communication links established by the plurality of wireless accessing means;
detecting means for detecting that wireless communication is possible for at least one of the plurality of wireless accessing means;
controlling means for executing control to establish the communication link for the wireless accessing means detected as being capable of wireless communication by the detecting means;
measuring means for measuring a radio field intensity of the communication link established by the wireless accessing means via the L2 tunnel;
switching means for switching a packet-transmitting communication link based on the radio field intensity measured by the measuring means; and
notifying means for notifying, when the packet-transmitting communication link has been switched by the switching means, the communication partner to that effect.

2. The mobile communication terminal according to claim 1, wherein
the detecting means detects for at least one of the plurality of wireless accessing means that the communication link established by this wireless accessing means has become invalid, and
the combining means removes the communication link detected as being invalid by the detecting means.

3. A mobile communication terminal comprising:
a plurality of wireless accessing means for establishing PPP-based (Point-to-Point Protocol-based) communication links for respectively different modes of wireless communications with a communication partner, one of the wireless accessing means from the plurality of wireless accessing means acquiring an IP address, used to establish a L2 (Layer 2) tunnel with the communication partner, and establishing a communication link via the L2 tunnel;
combining means for combining the communication links established by the plurality of wireless accessing means;
detecting means for detecting that wireless communication is possible for at least one of the plurality of wireless accessing means;
controlling means for executing control to establish the communication link for the wireless accessing means detected as being capable of wireless communication by the detecting means;
communication link change receiving means for receiving a request from the communication partner to change a packet-transmitting communication link;
switching means for switching the packet-transmitting communication link based on the request to change the communication link received by the communication link change receiving means; and
notifying means for notifying, when the packet-transmitting communication link has been switched by the switching means, the communication partner to that effect.

4. The mobile communication terminal according to claim 3, wherein the detecting means detects for at least one of the plurality of wireless accessing means that the communication link established by this wireless accessing means has become invalid, and the combining means removes the communication link detected as being invalid by the detecting means.

5. A communication apparatus comprising:

a plurality of communicating means for establishing PPP-based (Point-to-Point Protocol-based) communication links for respectively different modes of communications with a communication partner, one of the communicating means from the plurality of communicating means acquiring an IP address, used to establish a L2 (Layer 2) tunnel with the communication partner, and establishing a communication link via the L2 tunnel;

combining means for combining the communication links established by the plurality of communicating means;

monitoring means for monitoring a communication status of at least one of the plurality of communicating means;

communication link change requesting means for requesting the communication partner to change a packet-transmitting communication link based on the communication status monitored by the monitoring means;

measuring means for measuring a radio field intensity of the communication link established by the communicating means via the L2 tunnel;

switching means for switching a packet-transmitting communication link based on the radio field intensity measured by the measuring means; and notifying means for notifying, when the packet-transmitting communication link has been switched by the switching means, the communication partner to that effect.

6. A mobile communication method of a mobile communication terminal, the method comprising:

establishing PPP-based (Point-to-Point Protocol-based) communication links for respectively different modes of wireless communications with a communication partner;

acquiring an IP address to establish a L2 (Layer 2) tunnel with the communication partner;

establishing a communication link via the L2 tunnel;

combining the communication links established by a plurality of wireless accessing means;

detecting that wireless communication is possible for at least one of the plurality of wireless accessing means;

executing control to establish the communication link for the wireless accessing means detected as being capable of wireless communication in the detection step;

measuring a radio field intensity of the established communication link established via the L2 tunnel;

switching a packet-transmitting communication link based on the radio field intensity; and notifying, when the packet-transmitting communication link has been switched, the communication partner to that effect.

7. A communication method of a communication apparatus, the method comprising:

establishing PPP-based (Point-to-Point Protocol-based) communication links for respectively different modes of communications with a communication partner;

acquiring an IP address to establish a L2 (Layer 2) tunnel with the communication partner;

combining the communication links established by a plurality of communicating means;

monitoring a communication status of at least one of the plurality of communicating means;

requesting the communication partner to change a packet-transmitting communication link based on the communication status monitored in the monitoring step;

measuring a radio field intensity of the communication link established via the L2 tunnel;

switching a packet-transmitting communication link based on the radio field intensity; and notifying, when the packet-transmitting communication link has been switched, the communication partner to that effect.

* * * * *